(12) United States Patent
Fujibayashi

(10) Patent No.: US 7,318,136 B2
(45) Date of Patent: Jan. 8, 2008

(54) METHOD AND APPARATUS IMPLEMENTING VIRTUALIZATION FOR DATA MIGRATION WITH THE EFFICIENT USE OF OLD ASSETS

(75) Inventor: Akira Fujibayashi, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/592,981

(22) Filed: Nov. 6, 2006

(65) Prior Publication Data

US 2007/0050578 A1    Mar. 1, 2007

Related U.S. Application Data

(63) Continuation of application No. 10/788,390, filed on Mar. 1, 2004, now Pat. No. 7,149,859.

(51) Int. Cl.
*G06F 12/00* (2006.01)

(52) U.S. Cl. ............................ 711/162; 711/203; 714/7

(58) Field of Classification Search ................ 711/163, 711/203, 114; 714/6, 7; 709/223; 707/204
See application file for complete search history.

(56) References Cited

U.S. PATENT DOCUMENTS

| | | | |
|---|---|---|---|
| 5,544,347 A | 8/1996 | Yanai et al. | |
| 6,230,239 B1 | 5/2001 | Sakaki et al. | |
| 6,237,008 B1 | 5/2001 | Beal et al. | |
| 6,253,295 B1 | 6/2001 | Beal et al. | |
| 6,324,654 B1 | 11/2001 | Wahl et al. | |
| 6,351,792 B1 | 2/2002 | Milillo | |
| 6,446,175 B1 | 9/2002 | West et al. | |
| 6,499,091 B1 | 12/2002 | Bergsten | |
| 6,640,291 B2 | 10/2003 | Fujibayashi et al. | |
| 6,654,830 B1 | 11/2003 | Taylor et al. | |
| 6,714,949 B1 | 3/2004 | Frey, Jr. | |
| 6,836,821 B2 | 12/2004 | Moore et al. | |
| 6,947,981 B2 | 9/2005 | Lubbers et al. | |
| 2002/0178233 A1 | 11/2002 | Mastrianni et al. | |
| 2003/0033494 A1 | 2/2003 | Fujibayashi et al. | |
| 2003/0188114 A1 | 10/2003 | Lubbers et al. | |
| 2005/0138308 A1* | 6/2005 | Morishita et al. | ........... 711/162 |

FOREIGN PATENT DOCUMENTS

WO        WO 01/82058        11/2001

\* cited by examiner

*Primary Examiner*—Hong Kim
(74) *Attorney, Agent, or Firm*—Mattingly, Stanger, Malur & Brundidge, P.C.

(57) ABSTRACT

A method and apparatus for performing data migration in storage systems implementing the remote copy function, and virtualizing existing storage devices in a new storage system after migrating the existing storage devices. According to the invention when a new storage system is connected to an old storage system destined for replacement, and prior to starting data migration, remote copy configuration information from the old storage system is migrated to the new storage system. This allows either the new storage system or the old storage system, depending on configuration, to maintain an operational remote copy function with a remote storage system during the data migration. Thereafter, data is migrated from the old storage system as a virtual volume to the new storage system while data is being transferred between the new storage system and the remote storage system in accordance with the remote copy configuration information.

18 Claims, 12 Drawing Sheets

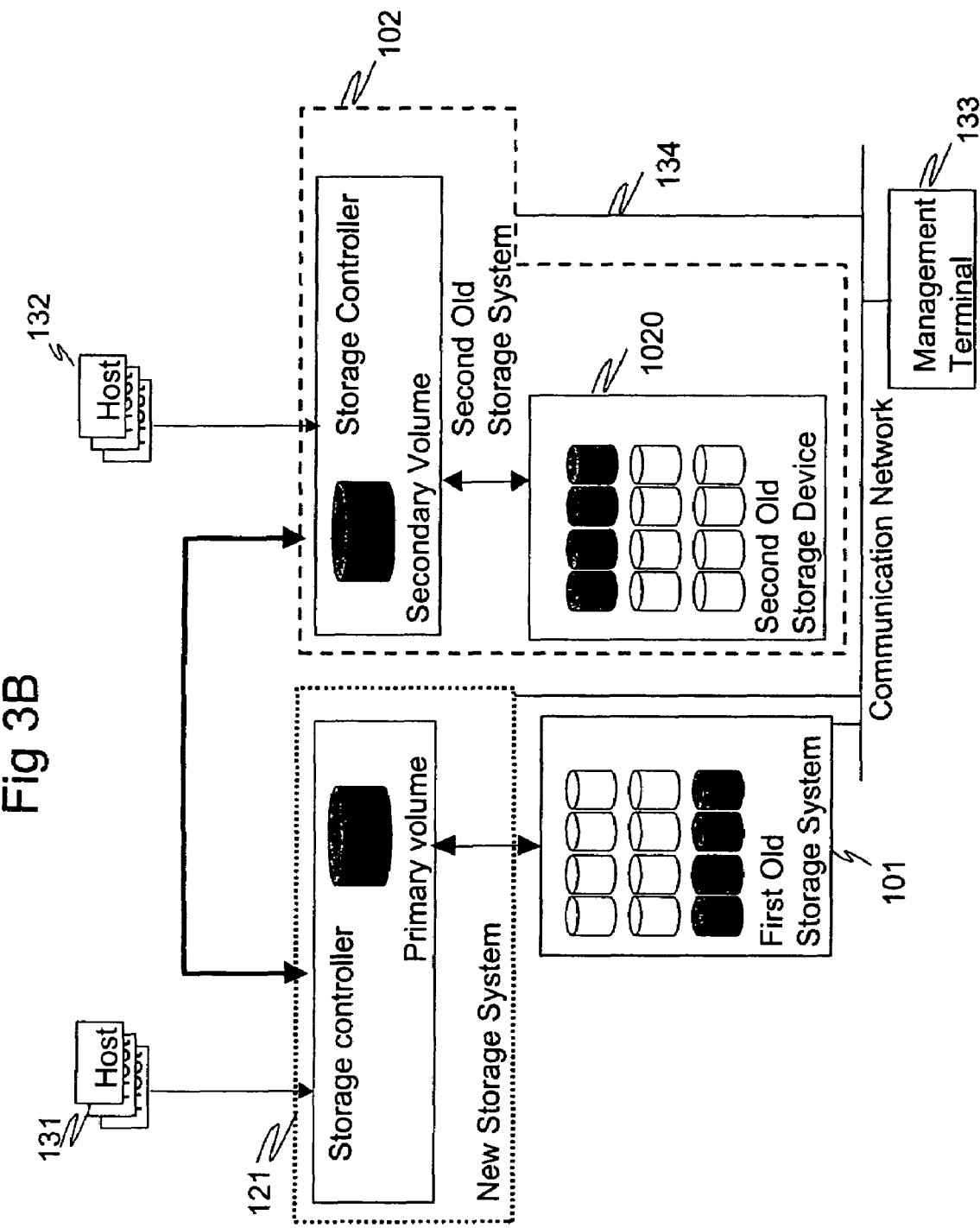

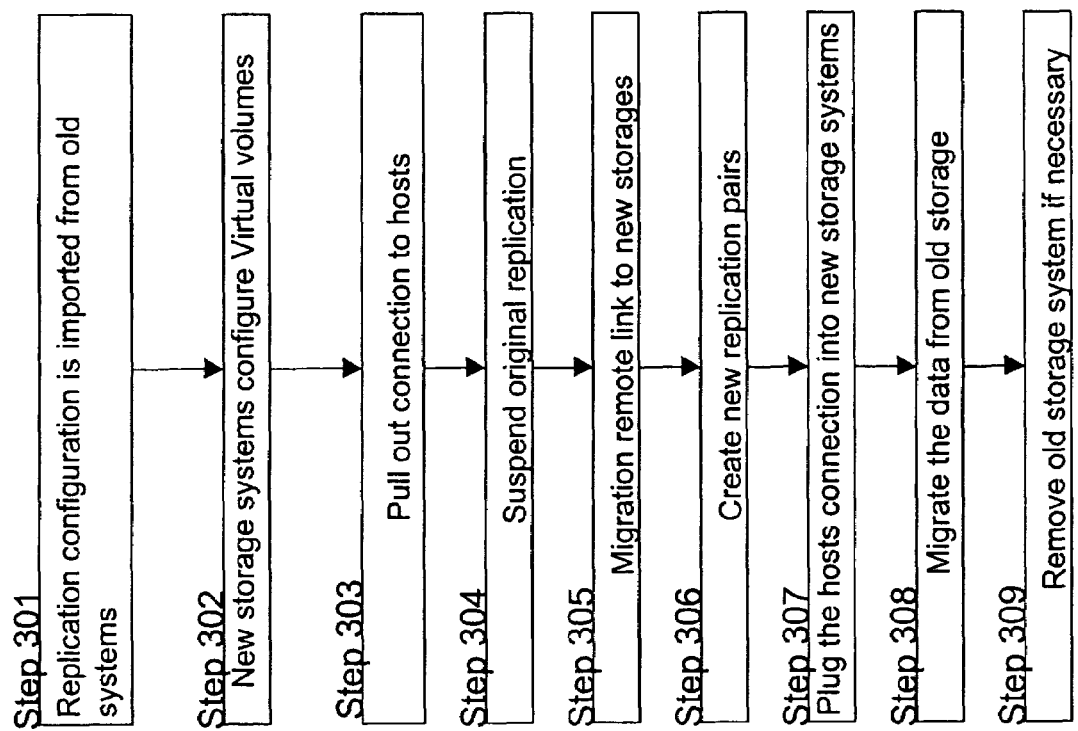

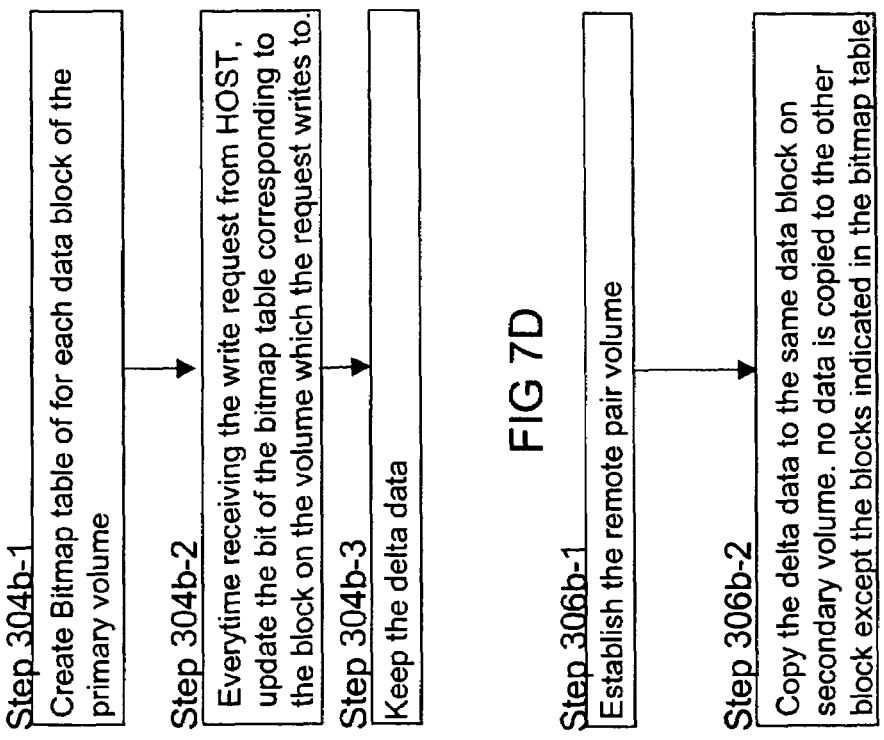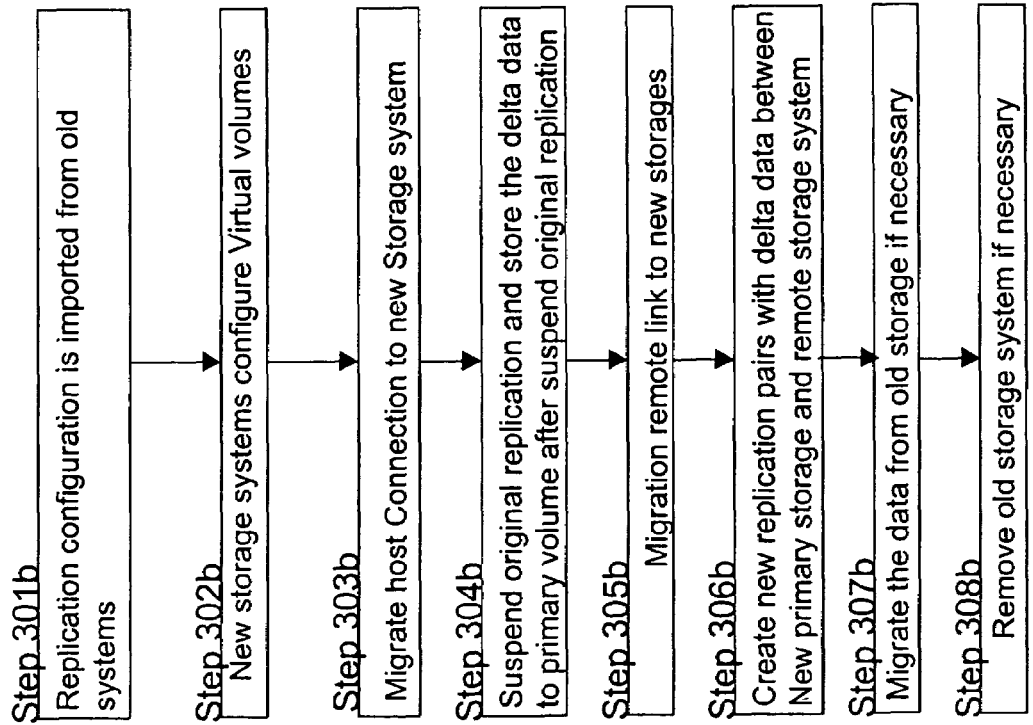

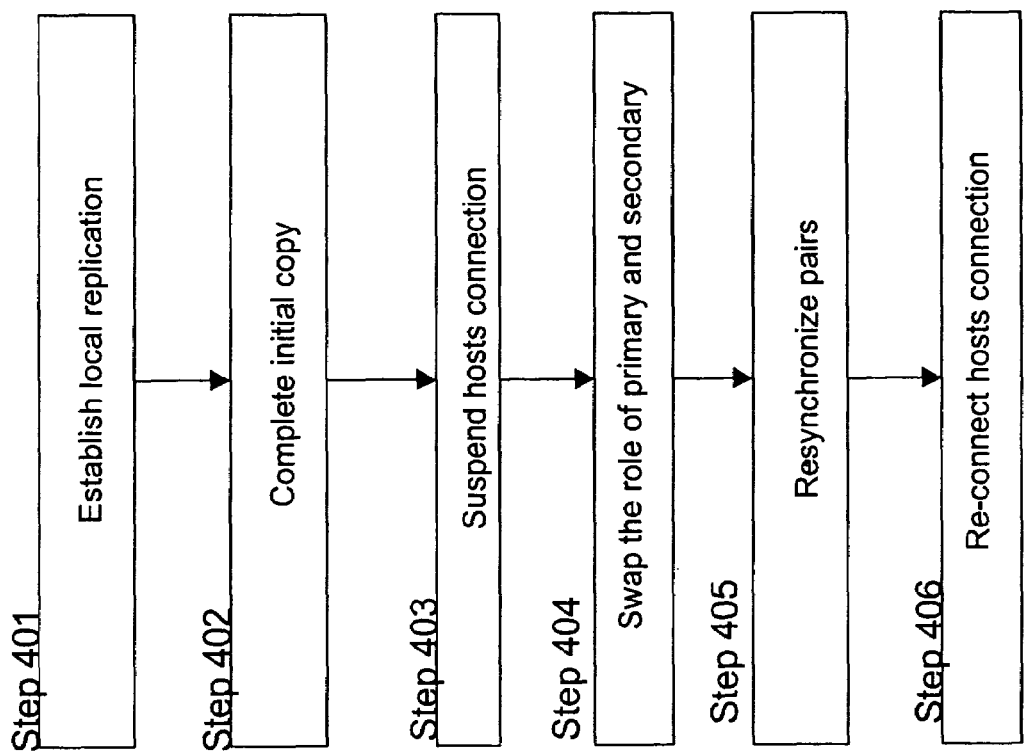

US 7,318,136 B2

METHOD AND APPARATUS IMPLEMENTING VIRTUALIZATION FOR DATA MIGRATION WITH THE EFFICIENT USE OF OLD ASSETS

CROSS-REFERENCE TO RELATED APPLICATIONS

This is a continuation application of U.S. patent application Ser. No. 10/788,390, filed Mar. 1, 2004 now U.S. Pat. No. 7,149,859.

BACKGROUND OF THE INVENTION

The present invention relates generally to a method and apparatus for data migration in a storage system. More particularly the present invention relates to a method and apparatus for virtualizing network storage of existing storage devices after migrating the existing storage devices to a new storage system.

Data migration is the process of transferring data from an old storage system to another while data stored in the old storage system remain accessible. Data migration has become popular with computer users because it allows for storage system replacements with minimum impact on services. Data migration, is well known in the art and is available for example from Hitachi. Data Systems of Santa Clara, Calif.

"Remote copy" is a mirroring technology that involves the copying of data from a local site to a remote site for back-up purposes. Typically, remote copy is done in real-time to provide continuous data protection, and thereby minimize data loss in the event of a disaster such as a storage system crash or unscheduled facility shutdown (e.g., due to fire, earthquake, power loss, etc.). Remote copy software and associated apparatus have been developed for backing-up the storage systems of a local mainframe computer using remote storage systems.

Users who have already implemented remote copy face a dilemma when replacing their storage systems during a data migration. On the one hand, these users typically have a need to upgrade their old storage systems in order to take advantage of the faster speed and higher capacity of newer storage systems. On the other hand, they cannot afford to disrupt their existing remote copy functions, and risk the possibility of data loss, during the data migration process. Because currently available techniques for performing data migration require that the remote copy function be stopped for long periods of time and/or reconfigured after the migration (which also takes a long time because the remote copy has to start over from an initial copy), most users do not have a choice but to risk data loss during the migration process. Further, a considerable investment may have been made in the old storage devices thus making it advantageous if these assets can be continued to be used after data migration.

From the foregoing, a technique for performing data migration with minimum impact on remote copy and that can continue the use of the old storage devices after data migration is highly desirable.

SUMMARY OF THE INVENTION

The present invention provides a method and apparatus for performing data migration in storage systems implementing the remote copy function and virtualizing storage of existing storage devices in a new storage system after migrating the existing storage devices to the new storage system.

According to the invention when a new storage system is connected to an old storage system destined for replacement and prior to starting data migration, remote copy configuration information from the old storage system is migrated to the new storage system. This allows either the new storage system or the old storage system, depending on configuration, to maintain an operational remote copy function with a remote storage system during the data migration. Thereafter, data is migrated from the old storage system as a virtual volume to the new storage system while data is being transferred between the new storage system and the remote storage system in accordance with the remote copy configuration information.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIGS. 3A-C illustrate a data migration setup for migrating data of the primary volume to the storage device of the first new storage system and migrating the secondary volume of the second old storage system to the second new storage system as a virtual volume;

FIGS. 7A-D are flow charts illustrating the steps of data migration according to the present invention; and FIG. 8 is a flow chart illustrating the steps of data migration including suspending synchronization and re-synchronizing remote replication between remote copy pairs.

DETAILED DESCRIPTION OF THE INVENTION

The present invention provides a method and apparatus for performing data migration in an existing storage system implementing the remote copy function and virtualizing storage of data of an old storage system in a new storage system after migrating data of the old storage system to the new storage system.

Figure 1:
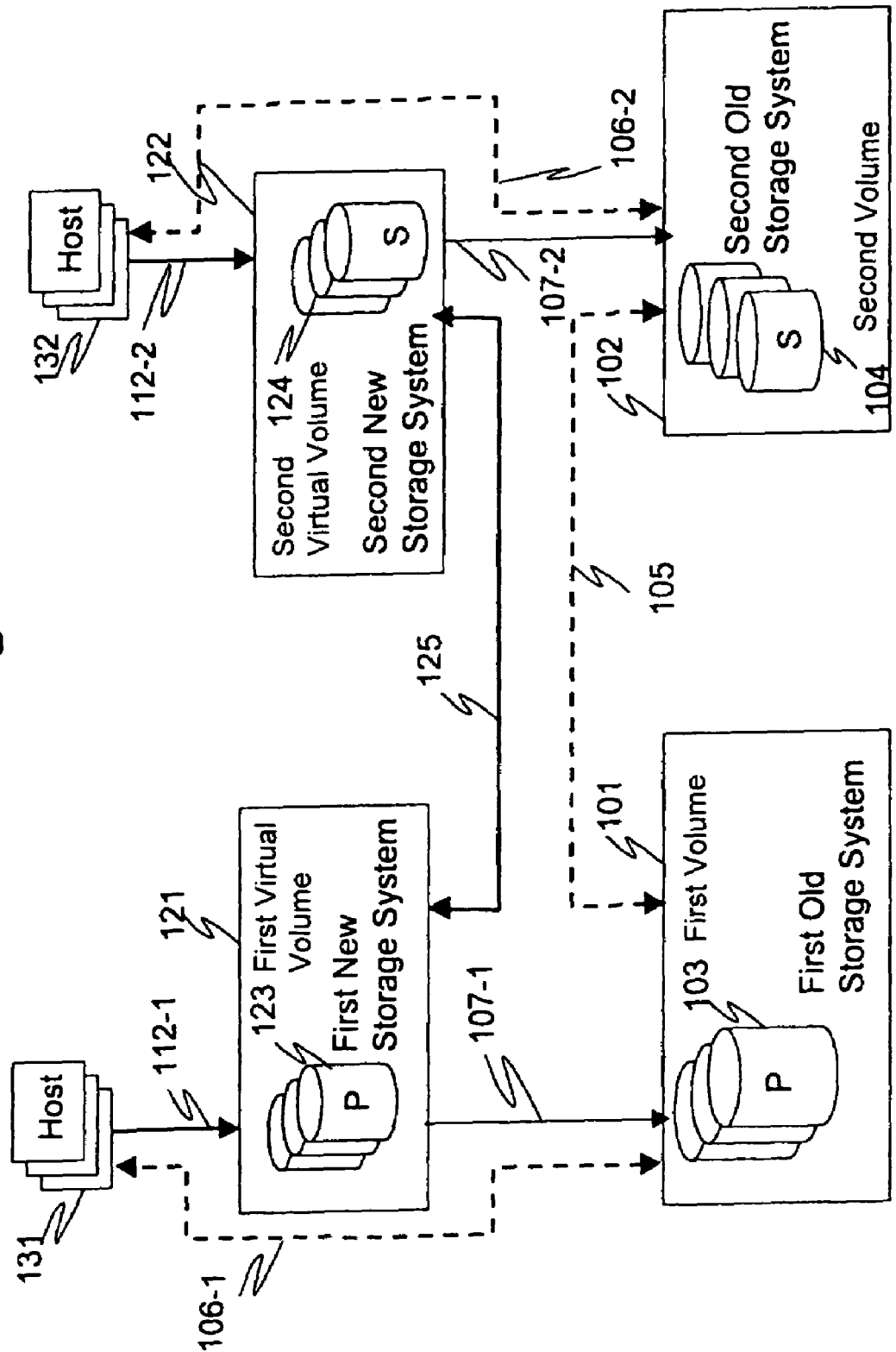
FIG. 1 illustrates a data migration setup for replacing old storage systems having the primary and secondary volumes with new storage systems having virtual volumes to which the primary and secondary volumes are migrated according to the present invention.

The present invention as illustrated in FIG. 1 provides a data migration setup to be implemented in an existing storage system including a first old storage system 101 which includes primary volumes 103 and a second old storage system 102 which includes secondary volumes 104. All Write Requests (WRs) to the primary volumes 103 are copied over to the secondary volumes 104 in synchronous or asynchronous mode via remote replication link 105. Hosts 131 are connected to the first old storage system 101 via connection 106-1 and hosts 132 are connected to the second old storage system 102 via connection 106-2.

According to the present invention, when data migration is to be conducted, the data migration setup according to the present invention introduces first and second new storage systems 121 and 122, respectively. The first new storage system 121 includes a virtual primary volume 123 and the second new storage system includes a virtual secondary volume 124. The first new storage system 121 connects to the first old storage system 101 via connection 107-1 and the second new storage system 122 connects to the second old storage system 102 via connection 107-2. Further, the first new storage system 121 connects to the hosts 131 via connection 112-1, and the second new storage system 122 connects to the hosts 132 via connection 112-2. Connections 107-1 and 107-2 and 112-1 and 112-2 are intended to replace connections 106-1 and 106-2. Still further, a connection 125 between the first and second new storage systems 121 and 122 is intended to replace remote replication link 105. The virtual primary and secondary volumes 123 and 124 provided by the new storage systems 121 and 122 are intended to replace primary and secondary volumes 103 and 104.

Figure 2A:
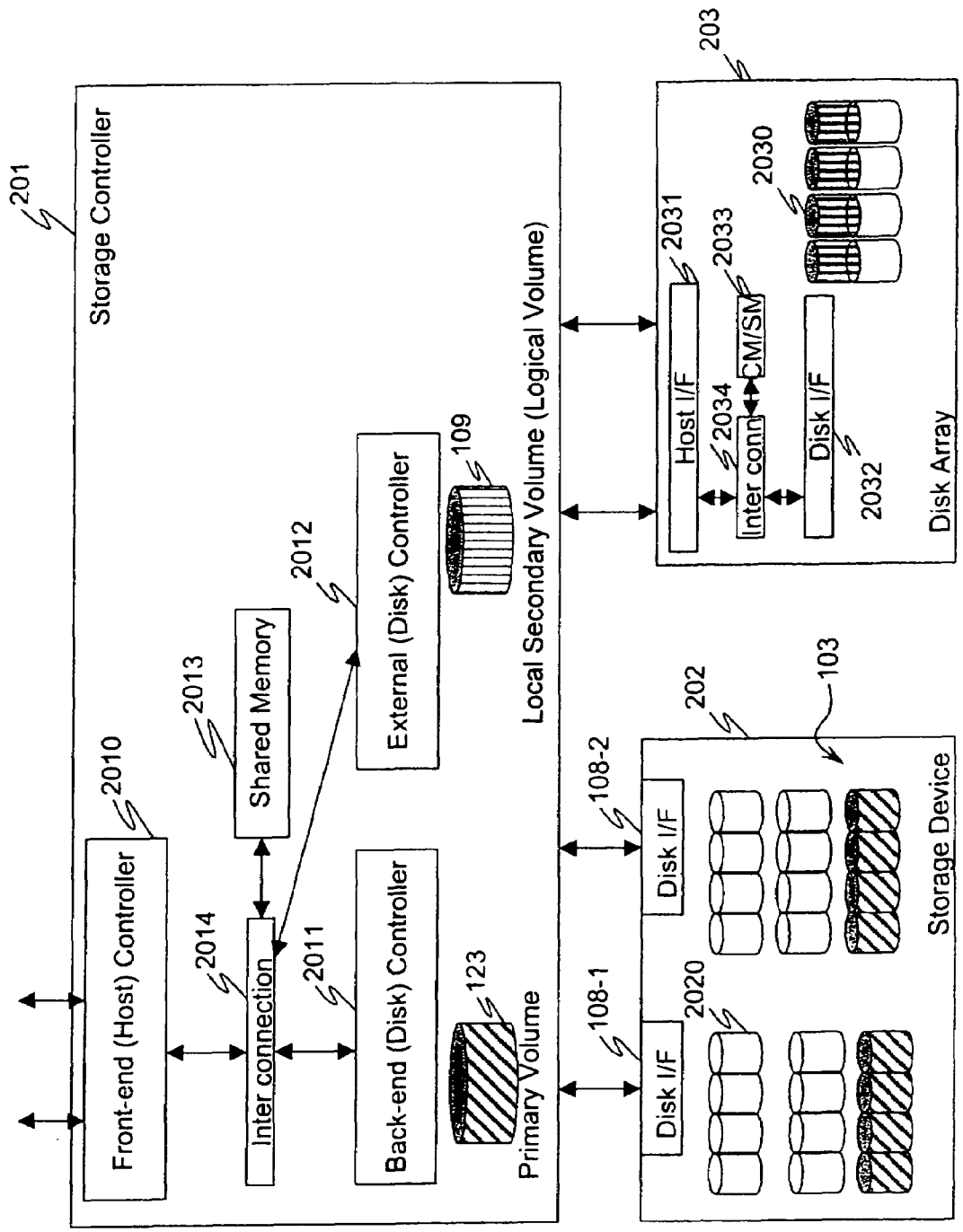
FIGS. 2A and 2B illustrate the internal configuration of the new storage system which could for example include a storage controller or an intelligent switch according to the present invention.
Figure 2B:
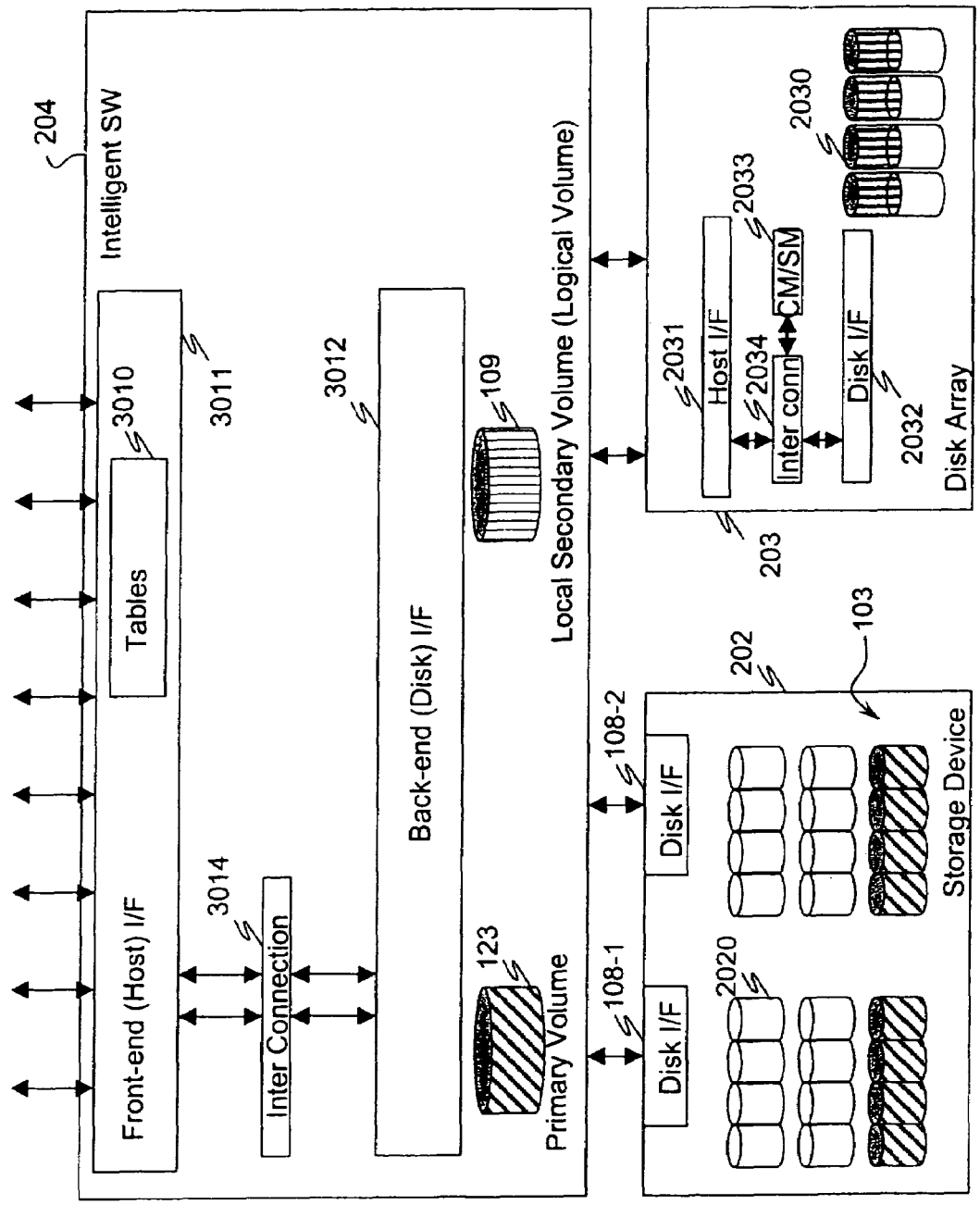

The internal structure of each of the new storage systems 121 and 122 are illustrated in FIGS. 2A and 2B, As per FIGS. 2A and 2B each of the new storage systems 121 and 122 includes at least two components, namely a storage controller or an intelligent switch and a plurality of storage devices.

As per FIG. 2A, the storage controller 201 includes a front end controller 2010 for interfacing with a channel of a host, back end controller 2011 for interfacing with a storage device 202 via disk interface (I/F) 108-1 and 108-2, an external storage controller 2012 for interfacing with a disk array 203, shared memory 2013 for caching data including control data transferred between the host and storage device 202 and the disk array 203 and an interconnection apparatus 2014 for interconnecting the front end controller 2010, back end and external storage controllers 2011 and 2012, respectively and shared memory 2013. Back end controller 2011 interfaces to the primary volume 103 and external storage controller 2012 interfaces to local secondary volume 109. It should be noted that the primary volume 103 and the local secondary volume 109 are logical volumes. The primary volume 103 is defined on a plurality of disk devices 2020 included in the storage device 202.

The local secondary volume 109 is defined on a plurality of disk drives 2030 included in the disk array 203 which includes a host interface (I/F) 2031 for interfacing with the storage controller 201, a disk I/F 2032 for interfacing with the disk drives 2030, a shared memory 2033 for caching data including control data transferred between the storage controller 201 and disk drives 2030, and an interconnection apparatus 2034 for interconnecting the host I/F 2031, disk I/F 2032, and shared memory 2033.

As illustrated in FIG. 2B an intelligent switch (SW) 204 in place of the storage controller 201 as per FIG. 2A is provided having a front end (host) controller 3011 for interfacing with a channel of a host, a back end controller 3012 for interfacing with the storage device 202 and the disk array 203 and an interconnection apparatus 3014 for interconnecting the front end controller 3011 and back end controller 3012. The back end controller 3012 interfaces to the primary volume 103 and the local secondary volume 109. The front end controller 3011 includes mapping tables 3010 having stored therein mapping information for mapping virtual volumes to the storage device 202 or the disk array 203. Particularly the mapping tables 3010 set relationships between a virtual volume block address and an actual block address on the storage device 202 or the disk array 203. As described above the primary volume 103 is defined on a plurality of disk devices 2020 included in the storage device 202 and the local secondary volume 109 is defined on a plurality of disk drives 2030 included in the disk array 203.

The various storage resources such the storage device 202, disk array 203, or any other such storage such as just a bunch of disks (JBOD), etc., are connected to a virtualization box implemented by the storage controller 201 or the intelligent SW 301, which can organize the various storages. In this case the ports of the storage device 202 and the disk array 203 are connected to the storage controller 201 or the intelligent SW 204 and these ports are all under the control of the storage controller 201 or the intelligent SW 204. Thus, as per the present invention as described above virtual volumes upon any existing storage device or disk array can be provided.

According to the present invention a key process of data migration is to import the existing Remote Copy (Replication) configuration information to the new storage system. As known the remote copy configuration information includes replication pair information, which identifies a volume or storage device in the storage system in the remote site designated to "mirror" a volume or storage device in the storage system in the local site. The remote copy configuration information normally includes at least following:

TABLE 1

| Group ID | P-Storage ID | P-Device ID | S-Storage ID | S-Device ID |
| --- | --- | --- | --- | --- |
| 0 | 2345678 | 100 | 4345678 | 10 |
| 0 | 2345678 | 200 | 4345678 | 20 |
| 0 | 2345678 | 300 | 4345678 | 30 |

The Group Identifier (ID) is the identifier of the replication pair group which includes one or more replication pairs that are to be treated as a single group. The group as identified by the Group ID guarantees Point-in-Time volume images across multiple volumes where the Storage ID is the identifier of the storage system and the Device ID is the identifier of the logical storage device in the storage system and "P" represents primary and "S" represents secondary. Thus Table 1 illustrates which devices in which storage system is configured as replication volumes. This information as shown in Table 1 can be obtained from the old storage systems 101 and 102 or the hosts 131 and 132.

The remote copy configuration information can also include a control bitmap and some management information. The control bitmap has information showing the difference between data on the local and remote storage systems. In one embodiment, the control bitmap includes information indicating which data blocks have been updated and thus need to be copied to the remote storage system. The management information includes the status of the pair of storage systems. In one embodiment, the pair of storage systems can either be in the SUSPEND, PAIR, or COPY state. SUSPEND indicates that the remote copy process between the local and remote storage systems is suspended. The difference between the local and remote storage systems, which is reflected in the control bitmap, increases in the SUSPEND state. PAIR indicates that there is no difference between the local and remote storage systems, thus allowing write requests to be processed immediately (synchronous mode) or periodically (asynchronous mode). COPY indicates that data is being copied from the primary storage system to the corresponding secondary storage system.

FIGS. 7A-D are flowcharts that illustrate the steps of the data migration process according to the present invention. In the data migration process according to the present invention, it is assumed that before conducting any of these steps physical connection of the old storage systems and the new storage systems are established.

As per the flowchart illustrated in FIG. 7A the remote copy configuration information is imported from the old storage system to the new storage system (Step 301). Based on the imported remote copy configuration information, the new storage system recognizes the volumes from old storage system and creates virtual volumes upon the original volumes and exposes these virtual volumes using the same identifiers (Logical Unit Numbers) as the original volumes (Step 302), Thereafter, the connection 106-1, 106-2 between the hosts 131, 132 and the old storage systems 101, 102 is disconnected or removed (Step 303). Synchronization between the replication pairs is suspended in time to interrupt host input/output (I/O) operations (Step 304). Thereafter, a connection is formed by the replication link 125 between the new storage systems 121 and 122 (Step 305). Replication pairs as per the remote copy configuration information between volumes and storages devices in the new storage systems 121 and 122 are created with no initial copy (Step 306). The new storage systems 121 and 122 are then connected to the host 131 and 132 by connectors 112-1 and 112-2 (Step 307). Data is migrated from the old storage systems 101 and 102 to the storage devices in the new storage systems 121 and 122 and/or migrated to virtual volumes 123 and 124 in the new storage systems 121 and 122 (Step 308). Finally the old storage systems 101 and 102 are removed if necessary (Step 309), otherwise the old storage systems 101 and 102 can be used as part of the storage available to the new storage systems 121 and 122 after data migration. The virtualization capabilities of the new storage systems 121 and 122 are useful in this regard. Thus, Steps 308 and 309 are optional depending upon user selection.

As per the flowchart illustrated in FIG. 7B, the remote copy configuration information is imported from the old storage system to the new storage system (Step 301 b). Based on the imported remote copy configuration information, the new storage system recognizes the volumes from the old storage system and creates virtual volumes based upon the original volumes and exposes these virtual volumes using the same identifiers (Logical Unit Numbers) as the original volumes (Step 302b). Thereafter, the connections 106-1, 106-2 between the hosts 131, 132 and the old storage systems 101, 102 are migrated to the new storage systems 121, 122 (Step 303b). Synchronization between the replication pairs is suspended in time to interrupt host input/output (I/O) operations and thereafter the delta (changed) data is stored to the primary volume (Step 304b). A connection is formed by the replication link 125 between the new storage systems 121 and 122 (Step 305b). Replication pairs as per the remote copy configuration information between volumes and storages devices in the new storage systems 121 and 122 are created with no initial copy (Step 306b). The data from the old storage systems 101 and 102 is migrated, if necessary (Step 307b). Finally the old storage systems 101 and 102 are removed, if necessary (Step 308b). Otherwise the old storage systems 101 and 102 can be used as part of the storage available to the new storage systems 121 and 122 after data migration. The virtualization capabilities of the new storage systems 121 and 122 are useful in this regard. Thus, Steps 307b and 308b are optional depending upon user selection.

The flowchart in FIG. 7C illustrates the details of Step 304b as described above. As per FIG. 7C Step 304b includes creating a bitmap table for each data block of the primary volume (Step 304b-1). Thereafter, each time a write request is received from the HOST, a bit of the bitmap table corresponding to the block on the volume upon which the write request is to write is updated (Step 304b-2). The delta (changed) data is then kept (Step 304b-3).

The flowchart in FIG. 7D illustrates the details of Step 306b as described above. As per FIG. 7D Step 306b includes establishing the remote replication pair volume (Step 306b-1). Thereafter, the delta (changed) data is copied to the same data block on the secondary volume and no data is copied to the other blocks except the blocks indicated in the bitmap table (Step 306b-2).

FIG. 8 illustrates another example of the data migration process according to the present invention. As per FIG. 7A, after conducting a step such as Step 301 importing the remote copy configuration information to the new storage systems 121 and 122, the replication pairs indicated as having been set between volumes on the old storage systems 101 and 102 are going to be established between volumes on the storage devices within the new storage systems 121 and 122. In Step 302 the volumes are virtually migrated into the new storage systems 121 and 122, but the actual location of the data is still in the old storage devices. So if a user also wants to migrate the actual location of the data to the new storage devices in the new storage system, then the local replication pair between the virtually migrated volume and the volume on the storage devices in the new storage systems 121 and 122 is created (Step 401). If a user doesn't need to migrate the location of the volume from the old storage device, conducting the steps in FIG. 8 is not necessary. Once the initial copy has finished, synchronization between the replication pair in local storage is established.

Thereafter, the connection between the hosts and the old storage systems 101 and 102 is removed, if data migration from a primary volume is to be conducted (Step 403). The local replication pair is temporarily suspended and the roles of the primary and the secondary volumes in the local replication setup are swapped (Step 404). Synchronization between the replication pairs is re-established (Step 405). At this point, conducting to create the new remote replication pair between the volume on storage devices in local storage system and the volume on the remote storage system (step 304 in FIG. 7A) is ready. The connection between the hosts and the old storage systems is re-established if necessary (Step 406).

FIGS. 3A-C and 4-6 illustrate various examples of different configurations of the present invention where all or a portion of the data in a volume of an old storage system is moved to either a virtual volume or the storage device of a new storage system. These configurations of the present invention allow for a user to utilize various advantages offered by the different configurations, including the continued use of the storage devices of the old storage system for any desired purpose such as part of the storage available to the new storage system.

Figure 3A:
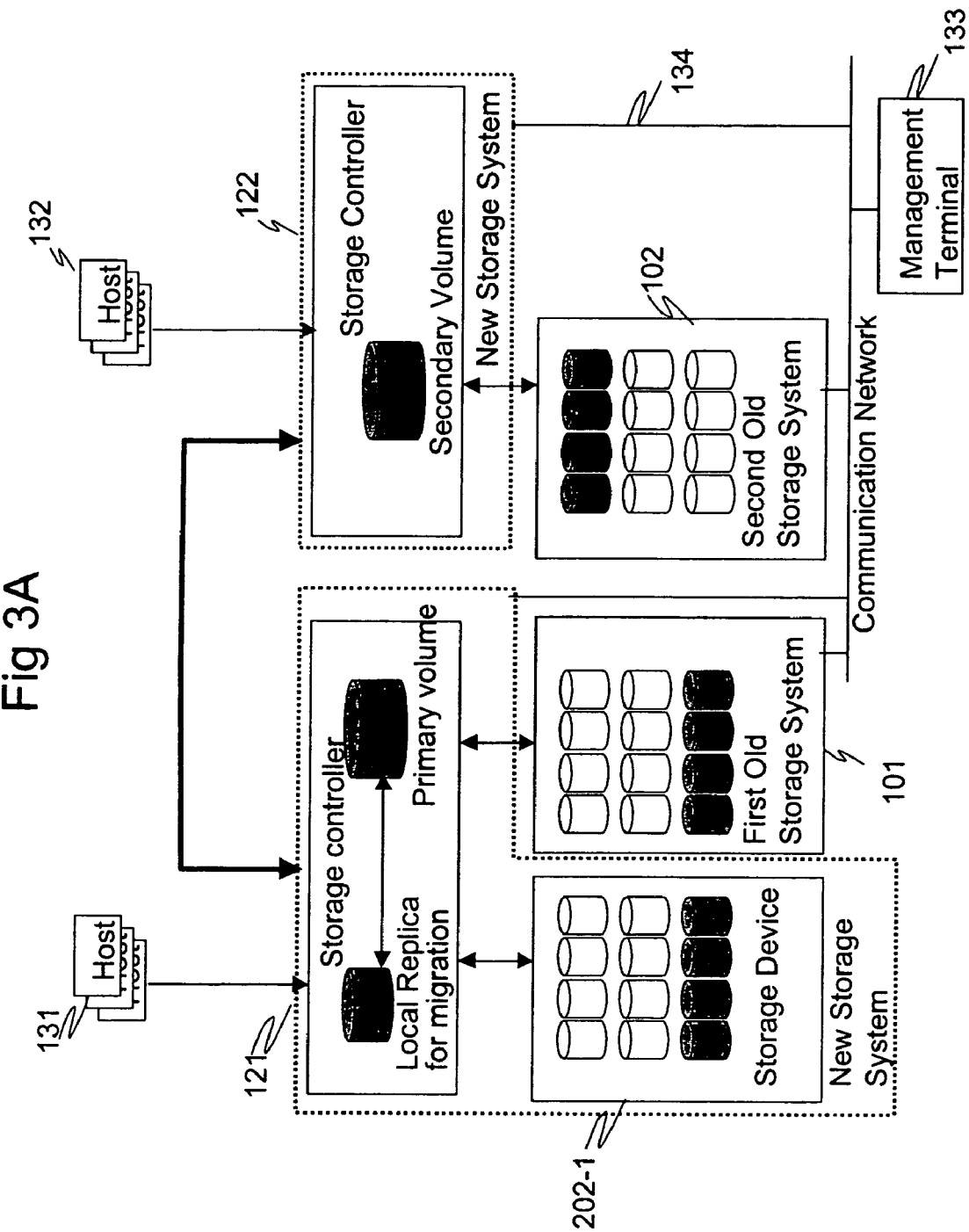

FIG. 3A illustrates a data migration setup for migrating data of the primary volume as represented on the storage device of the first old storage system 101 to the storage device 202-1 of the first new storage system 121 and migrating the secondary volume as represented on the storage device of the second old storage system 102 to the second new storage system 122 as a virtual volume rather than migrating the data of the secondary volume to the storage device of the second new storage system 122. It should be noted that each of the first and second old storage systems 101 and 102, respectively, and the first and second new storage systems 121 and 122, respectively, are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 3A, data on the primary volume 103 (as illustrated in FIG. 1) of the first old storage system 101 is migrated (moved) to the storage device 202-1 of the first new storage system 121 and data of the secondary volume 104 of the second old storage system 102 is not moved but is instead managed by the second new storage system 122 as a virtual volume 124 (as illustrated in FIG. 1) by continuing use of a storage device or disk array of the second old storage system 102. Therefore, according to the present invention a new replication pair is established between the storage device 202-1 of the first new storage system 121 and the storage device or disk array of the second old storage system 102.

FIG. 3B illustrates a data migration setup for migrating the primary volume as represented on the storage device of the first old storage system 101 to the first new storage system 121 as a virtual volume and keeping the second storage system 102 as the remote storage system. Accordingly the present invention maintains the secondary volume as represented on the storage device 1020 of the second old storage system 102 as the secondary volume. It should be noted that each of the first and second old storage systems 101 and 102, respectively, and the first new storage system 121 are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 3B, data on the primary volume 103 (as illustrated in FIG. 1) of the first old storage system 101 is not moved to the first new storage system 121 but is instead managed as a virtual volume by the first new storage system 121 and the second storage system 102, including data of the secondary volume of the second old storage system 102, is kept as the second (remote) storage system, thereby continuing the use of the second old storage system 102. Therefore, according to the present invention a replication pair is established (or maintained) between the storage device of the first old storage system 101 and the storage device 1020 of the second old storage system 102.

Figure 3C:
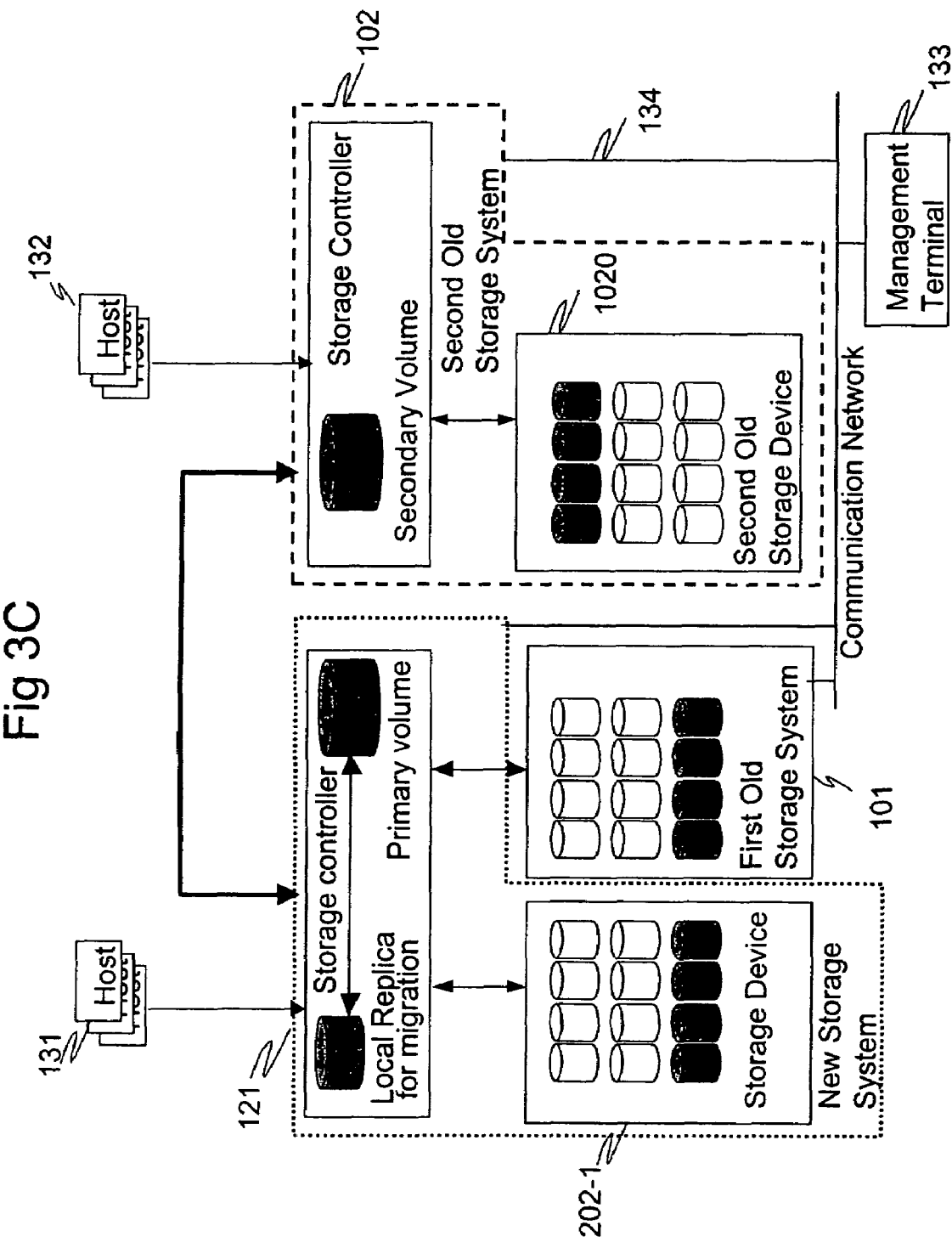

FIG. 3C illustrates a data migration setup for migrating data of the primary volume as represented on the storage device of the first old storage system 101 to the storage device 202-1 of the first new storage system 121 and keeping the second storage system 102 as the second (remote) storage system. Accordingly, the present invention maintains the secondary volume as represented on the storage device 1020 of the second old storage system 102 as the secondary volume. It should be noted that each of the first and second old storage systems 101 and 102, respectively, and the first new storage system 121 are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 3C, data on the primary volume 103 (as illustrated in FIG. 1) of the first old storage system 101 is moved to the storage device 202-1 of the first new storage system 121 and the second storage system 102, including data of the secondary volume of the second old storage system 102, is kept as the second (remote) storage system, thereby continuing the use of the second old storage system 102. Therefore, according to the present invention a new replication pair is established between the storage device 202-1 of the first new storage system 121 and the storage device 1020 of the second old storage system 102.

Figure 4:
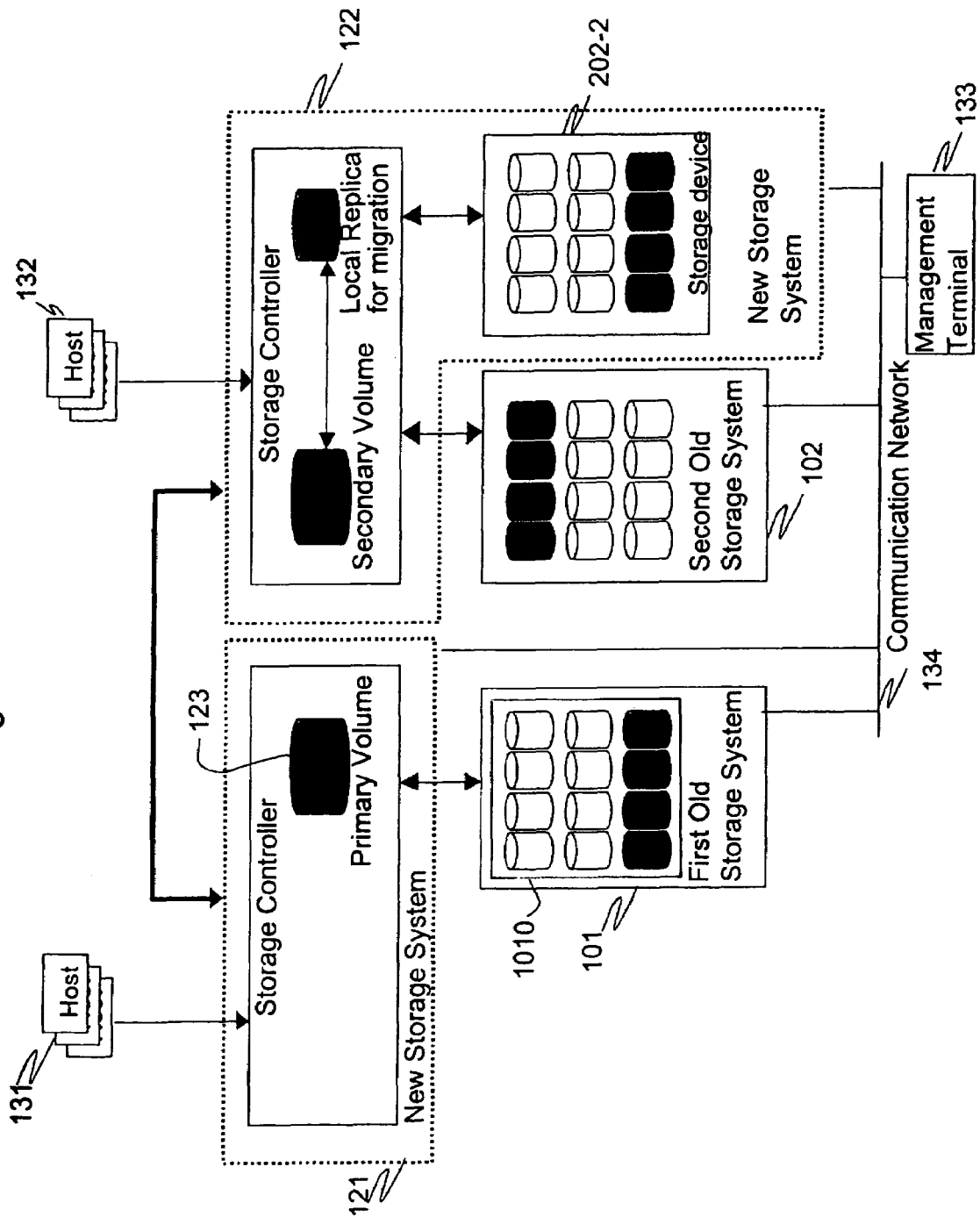
FIG. 4 illustrates a data migration setup for migrating the primary volume of the first old storage system to the first new storage system as a virtual volume and migrating data of the secondary volume to the storage device of the second new storage system.

FIG. 4 illustrates a data migration setup for migrating the primary volume 103 of the first old storage system 101 to the first new storage system 121 as a virtual volume 123 rather than migrating data to the storage device of the first new storage system 121 and migrating data of the secondary volume 104 to the storage device 202-2 of the second new storage system 122. It should be noted that each of the first and second old storage systems 101 and 102, respectively, and the first and second new storage systems 121 and 122, respectively, are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 4, data of the primary volume 103 of the first old storage system 101 is not moved but is instead managed by the first new storage system 121 as a virtual volume 123 by continuing use of a storage device or disk array 1010 of the first old storage system 101 and data on the secondary volume 104 of the second old storage system 102 is moved to the storage device 202-2 of the second new storage system 122. Therefore, according to the present invention a new replication pair is established between the storage device or disk array 1010 of the first old storage system 101 and the storage device 202-2 of the second new storage system 102.

Figure 5:
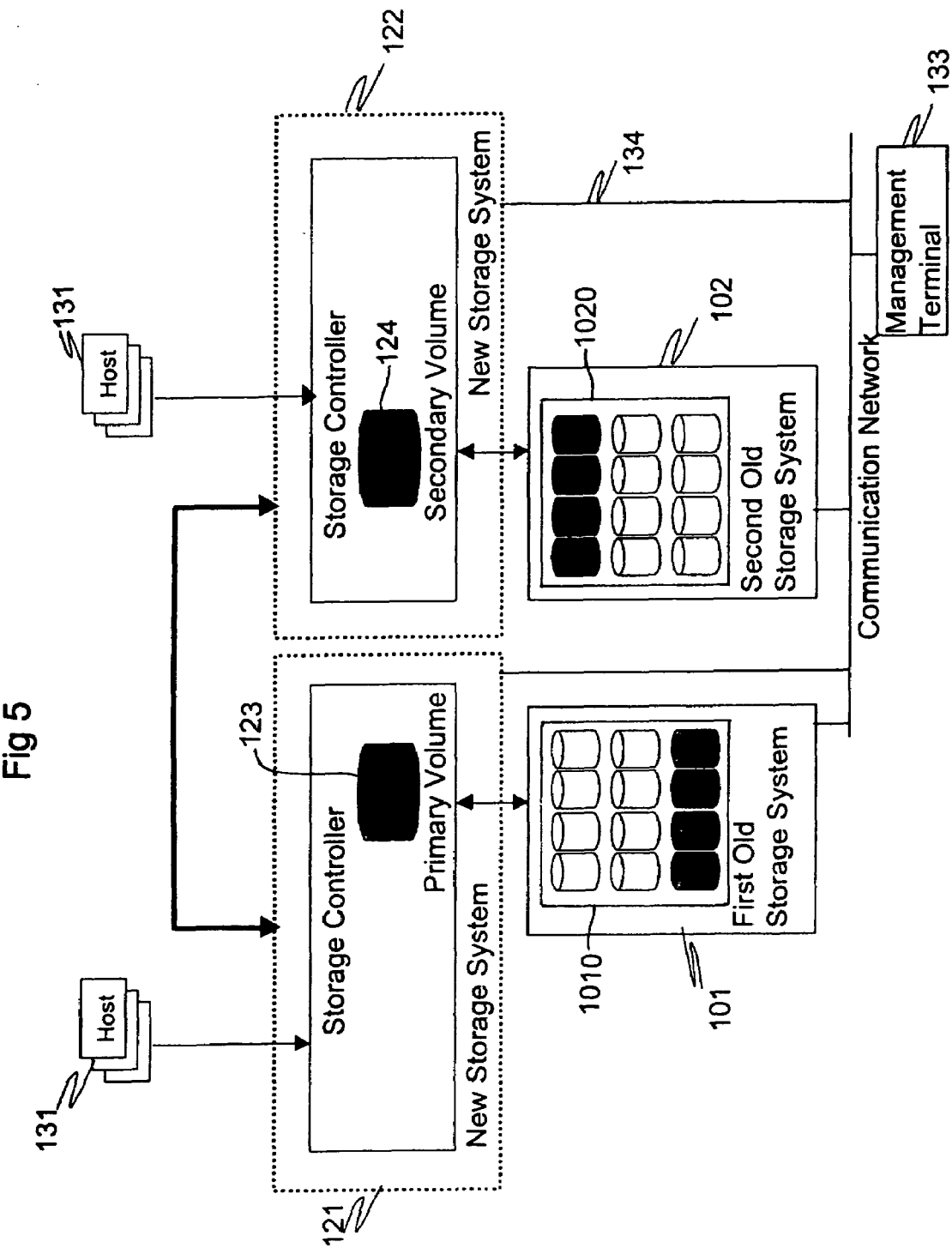
FIG. 5 illustrates a data migration setup for migrating the primary volume of the first old storage system to the first new storage system as a virtual volume and migrating the secondary volume of the second old storage system to the second new storage system as a virtual volume.

FIG. 5 illustrates a data migration setup for migrating the primary volume 103 of the first old storage system 101 to the first new storage system 121 as a virtual volume 123 rather than migrating data to a storage device of the first new storage system 121 and migrating the secondary volume 104 of the second old storage system 102 to the second new storage system 122 as a virtual volume 124 rather than migrating data to a storage device of the second new storage system 102. It should be noted that each of the first and second old storage systems 101 and 102, respectively, and the first and second new storage systems 121 and 122, respectively, are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 5, data of the primary volume 103 of the first old storage system 101 is not moved but is instead managed by the first new storage system 121 as a virtual volume 123 by continuing use of the storage device or disk array 1010 of the first old storage system 101 and data of the secondary volume 104 of the second old storage system 102 is not moved but is instead managed by the second new storage system 122 as a virtual volume 124 by continuing use of the storage device or disk array 1020 of the second old storage system 102. Therefore, according to the present invention a new replication pair is established between the storage device or disk array 1010 of the first old storage system 101 and the storage device or disk array 1020 of the second old storage system 102.

Figure 6:
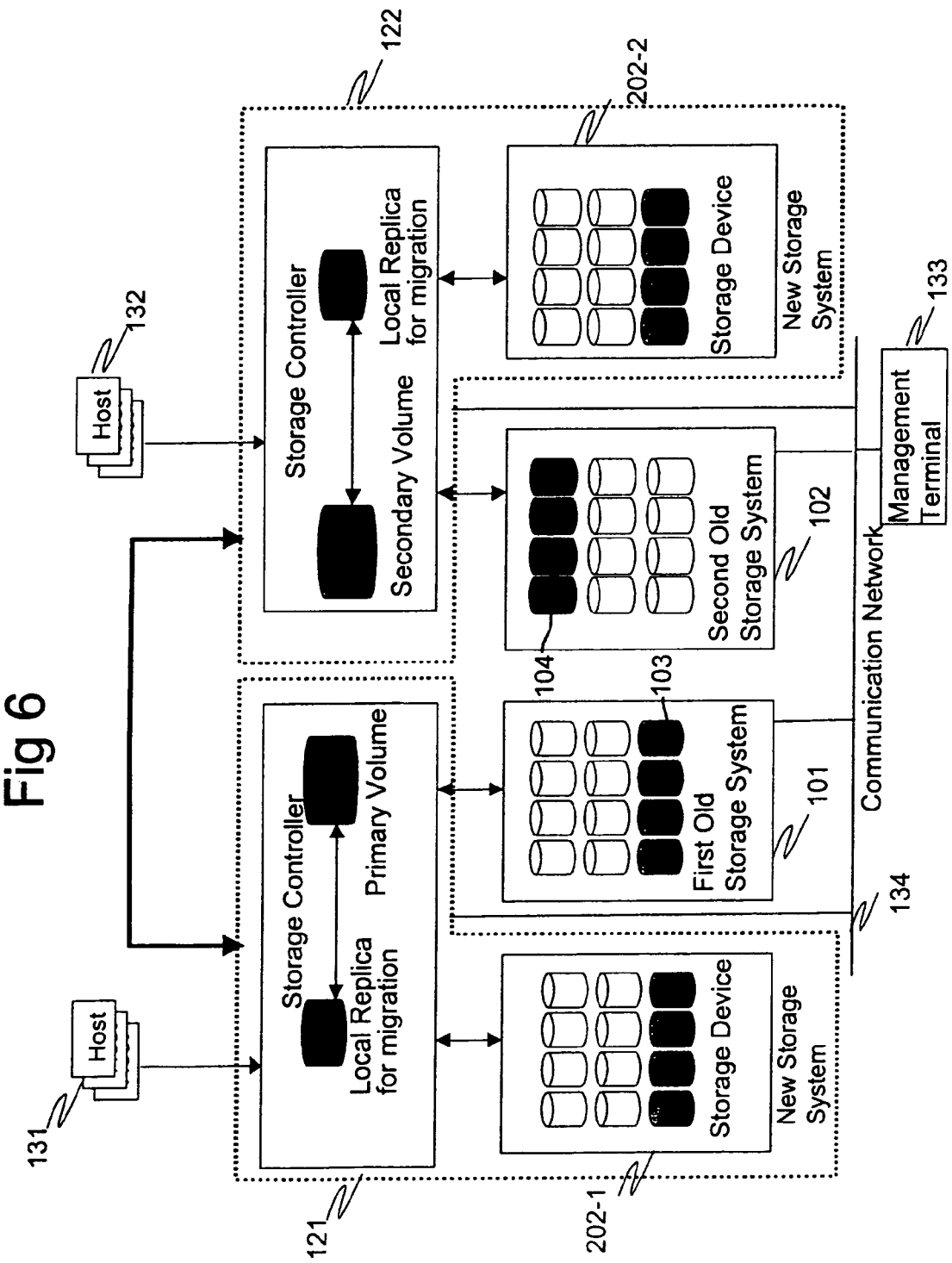
FIG. 6 illustrates a data migration setup for migrating data of the primary volume to the storage device of the first new storage system and migrating data of the secondary volume to the storage device of the second new storage system.

FIG. 6 illustrates a data migration setup for migrating data of the primary volume 103 to the storage device 202-1 of the first new storage system 121 and migrating data of the secondary volume 104 to the storage device 202-2 of the second new storage system 122. It should be noted that each of the first and second old storage systems 101 and 102, respectively, and the first and second new storage systems 121 and 122, respectively, are connected to each other by a communication network 134 which is further connected to a management terminal 133. The management terminal 133, via the communication network 134, can be used by a system administrator (user, etc.) to manage the operation of the storage systems together as a whole or manage the operation of each of the storage systems individually.

Thus, according to the present invention as illustrated in FIG. 6, data on the primary volume 103 of the first old storage system 101 is moved to the storage device 202-1 of the first new storage system 121 and data on the secondary volume 104 of the second old storage system 102 is moved to the storage device 202-2 of the second new storage system 122. Therefore, according to the present invention a new replication pair is established between the storage device 202-1 of the first new storage system 101 and the storage device 202-2 of the second new storage system 102.

As described above the present invention provides a method and apparatus for performing data migration in storage systems implementing the remote copy function and virtualizing existing storage devices in a new storage system after migrating the existing storage devices to the new storage system.

As per the present invention when a new storage system is connected to an old storage system destined for replacement, and prior to starting data migration, remote copy configuration information from the old storage system is migrated to the new storage system. This allows either the new storage system or the old storage system, depending on configuration, to maintain an operational remote copy function with a remote storage system during the data migration. Thereafter, data is migrated from the old storage system as a virtual volume to the new storage system while data is being transferred between the new storage system and the remote storage system in accordance with the remote copy configuration information.

While the invention has been described in, terms of its preferred embodiments, it should be understood that numerous modifications may be made thereto without departing from the spirit and scope of the present invention. It is intended that all such modifications fall within the scope of the appended claims.

What is claimed:

1. A system for performing data migration, comprising:
a first storage system including a first storage controller and a first data volume configured with a plurality of physical storages therein, the first storage controller being configured to receive a write request from a host computer and to store write data associated with the write request to the first data volume; and
a second storage system coupled to the first storage system, including a second storage controller and a second data volume configured with a plurality of physical storages therein, the second storage controller being configured to receive a copy of the write data for copying the write data stored in the first data volume to the second data volume based on copy configuration information, said copy configuration information including a relationship between the first data volume and the second data volume;
wherein a third storage system coupled to the first and second storage systems receives the copy configuration information from the first storage system and maps a virtual volume to the first data volume so as to present the first data volume via the virtual volume to the host computer, and then, based on the received copy configuration information, sends to the second storage system a copy of write data associated with write requests received from the host computer directed to the virtual volume.

2. The system of claim 1,
wherein the first storage system further includes a third data volume and the second storage system includes a fourth data volume which is defined as a copy pair of the third data volume with the copy configuration information, and
wherein the third storage system receives stored data in the third data volume from the first storage system to copy the stored data to a fifth data volume when the fifth data volume is designated to replace the third data volume, and then, based on the received copy configuration information, sends to the second storage system a copy of write data associated with write requests received from the host computer directed to the fifth data volume.

3. The system of claim 1,
wherein the first storage system and the third storage system are primary storage systems, and the second storage system is a secondary storage system designated to back-up the first storage system.

4. The system of claim 1, further comprising:
a fourth storage system coupled to the second and third storage systems, said fourth storage system receiving the copy configuration information from the second storage system or the third storage system, and mapping a second virtual volume to the second data volume so as to present the second data volume via the second virtual volume to the third storage system,
wherein the fourth storage system receives the copy of the write data sent to the second storage system by the third storage system as being directed to the second virtual volume, and stores the copy of the write data to the second data volume in the second storage system.

5. The system of claim 1,
wherein the first storage system creates a bitmap table for each data block of the first data volume, and, for each write request received from the host computer, updates a bit of said bitmap corresponding to a block on the first data volume to which the write request is directed, and
wherein, when the third storage system maps the virtual volume to the first data volume so as to present the first data volume via the virtual volume to the host computer, delta data is copied to data blocks in said second volume corresponding with the blocks indicated to have been changed in the bitmap table.

6. The system of claim 1,
wherein the virtual volume in the third storage system is created using a same logical unit number identifier as was used for the first data volume.

7. The system of claim 1,
wherein, following commencement of sending of the copy of the write data from said third storage system to the second volume on the second storage system based on the copy configuration information, data from the first data volume on said first storage system is migrated to the third storage system by establishing a local replication pair between said virtual volume and a local logical volume on said third storage system.

8. A method for performing data migration, comprising:
configuring a first data volume on a first storage system, said first storage system including a first storage controller and a plurality of physical storages for configuring said first data volume;
configuring the first storage controller to receive write requests from a host computer and to store write data associated with the write requests to the first data volume;
configuring a second data volume on a second storage system coupled to the first storage system, said second storage system including a second storage controller and a plurality of physical storages for configuring said second data volume;
configuring the second storage controller to receive a copy of the write data for copying the write data stored in the first data volume to the second data volume based on copy configuration information, said copy configuration information including a relationship between the first data volume and the second data volume;
coupling a third storage system to the first and second storage systems;
transferring the copy configuration information from the first storage system or the second storage system to the third storage system;
mapping a virtual volume on the third storage system to the first data volume to present the first data volume via the virtual volume to the host computer;
sending to the second storage system, based on the received copy configuration information, a copy of write data associated with write requests received from the host computer directed to the virtual volume.

9. The method according to claim 8, further comprising steps of:
configuring a third data volume on the first storage system and a fourth data volume on the second storage system, wherein the fourth data volume is defined as forming part of a copy pair with the third data volume by the copy configuration information, and
receiving, by the third storage system, stored data in the third data volume from the first storage system to copy the stored data to a fifth data volume configured in the third storage system, when the fifth data volume is designated to replace the third data volume; and
sending to the second storage system, based on the received copy configuration information, a copy of write data associated with write requests received from the host computer directed to the fifth data volume.

10. The method according to claim 8, further comprising steps of:
configuring the first storage system and the third storage system as primary storage systems, and the second storage system as a secondary storage system designated to receive replication.

11. The method according to claim 8, further comprising steps of:
following commencement of transfer of the copy of the write data between the third storage system and the second storage system based on the copy configuration information, migrating data from said first data volume on said first storage system to said third storage system by establishing a local replication pair on said third storage system between said virtual volume and a local logical volume.

12. The method according to claim 8, further comprising steps of:
creating the virtual volume in the third storage system using a same logical unit number identifier as was used for the first data volume.

13. The method of claim 1, further comprising steps of:
after transferring the copy configuration information from the first storage system to the second storage system, removing a host connection between the first storage system and the host computer; and
coupling the host computer to the third storage system.

14. A system for performing data migration, comprising:
a first storage system including a first storage controller and a first data volume configured with a plurality of physical storages therein, the first storage controller being configured to receive a write request from a host computer and to store write data associated with the write request to the first data volume; and
a second storage system coupled to the first storage system, including a second storage controller and a second data volume configured with a plurality of physical storages therein, the second storage controller being configured to receive a copy of the write data for copying the write data stored in the first data volume to the second data volume based on copy configuration information, said copy configuration information including a relationship between the first data volume and the second data volume,
wherein a third storage system coupled to the first storage system receives the copy configuration information from the first storage system and maps a first virtual volume to the first data volume to present the first data volume via the first virtual volume to the host computer,
wherein a fourth storage system coupled to the second and third storage systems receives the copy configuration information from the second or third storage systems and maps a second virtual volume to the second data volume to present the second data volume via the second virtual volume to the third storage system,
wherein, based on the received copy configuration information, the third storage system sends to the fourth storage system a copy of write data associated with write requests received from the host computer directed to the first virtual volume.

15. The system according to claim 14,
wherein, following commencement of sending of the copy of the write data from said third storage system to the fourth storage system based on the copy configuration information, data from the first data volume on said first storage system is migrated to the third storage system by establishing a local replication pair between said first virtual volume and a local logical volume on said third storage system.

16. The system according to claim 14,
wherein the first storage system and the third storage system are primary storage systems, and the second storage system and fourth storage system are secondary storage systems designated to receive replication from the primary storage systems.

17. The system according to claim 14,
wherein the first storage system creates a bitmap table for each data block of the first data volume, and, for each write request received from the host computer, updates a bit of said bitmap corresponding to a block on the first data volume to which the write request is directed, and
wherein when the third storage system maps the first virtual volume to the first data volume so as to present the first data volume via the first virtual volume to the host computer, delta data is copied to data blocks in said second volume corresponding with the blocks indicated to have been changed in the bitmap table.

18. The system according to claim 14,
wherein the first virtual volume in the third storage system is created using a same logical unit number identifier as was used for the first data volume, and the second virtual volume in the fourth storage system is created using a same logical unit number identifier as was used for the second data volume.

* * * * *